United States Patent
Luo et al.

(10) Patent No.: US 12,283,872 B2
(45) Date of Patent: Apr. 22, 2025

(54) MOTOR HAVING MULTIPLE COOLING FLOW CHANNELS, ARC-SHAPED CHANNEL, AND LIQUID THROWING HOLES

(71) Applicants: South China University of Technology, Guangzhou (CN); KINETEK DE SHENG (SHUNDE) MOTOR CO., LTD., Foshan (CN)

(72) Inventors: Zhao Luo, Guangzhou (CN); Zhenping Wan, Guangzhou (CN); Xuesong Hu, Guangzhou (CN); Rongsheng Xi, Foshan (CN); Peili Xie, Foshan (CN); Maoxing He, Foshan (CN)

(73) Assignees: South China University of Technology, Guangzhou (CN); KINETEK DE SHENG (SHUNDE) MOTOR CO., LTD., Foshan (CN)

( * ) Notice: Subject to any disclaimer, the term of this patent is extended or adjusted under 35 U.S.C. 154(b) by 301 days.

(21) Appl. No.: 18/061,487

(22) Filed: Dec. 5, 2022

(65) Prior Publication Data

US 2023/0198340 A1 Jun. 22, 2023

(30) Foreign Application Priority Data

Dec. 22, 2021 (CN) .......................... 202111578359.3

(51) Int. Cl.
*H02K 9/19* (2006.01)
*H02K 1/20* (2006.01)
(Continued)

(52) U.S. Cl.
CPC ............... *H02K 9/193* (2013.01); *H02K 1/20* (2013.01); *H02K 1/32* (2013.01); *H02K 5/20* (2013.01)

(58) Field of Classification Search
CPC .......... H02K 7/003; H02K 7/006; H02K 9/19; H02K 5/124; H02K 3/52; H02K 3/527;
(Continued)

(56) References Cited

U.S. PATENT DOCUMENTS 3,521,094 A * 7/1970 Widder .................. H02K 9/197
310/58
4,409,502 A * 10/1983 McCabria ................ H02K 3/24
310/214

(Continued)

*Primary Examiner* — Maged M Almawri
(74) *Attorney, Agent, or Firm* — True Shepherd LLC; Andrew C. Cheng

(57) ABSTRACT

A motor having multiple cooling flow channels, includes a housing, a stator, and a rotor. The stator comprises a winding. The housing comprises a cooling liquid inlet, an arc-shaped flow channel, and a cooling liquid outlet; the arc-shaped flow channel is defined around the housing and connected to the stator core; the rotor comprises a rotor flow channel; both the rotor flow channel and the arc-shaped flow channel are communicated with the cooling liquid inlet and outlet; and the rotor flow channel and the arc-shaped flow channel respectively correspond to two ends of the winding. A cooling liquid enters the arc-shaped flow channel for cooling the housing and a stator core of the motor, and enters the rotor flow channel for cooling the rotor. The cooling liquid flows through the rotor flow channel and the arc-shaped flow channel for respectively cooling the ends of the winding.

9 Claims, 8 Drawing Sheets

(51) Int. Cl.
*H02K 1/32* (2006.01)
*H02K 5/20* (2006.01)
*H02K 9/193* (2006.01)

(58) Field of Classification Search
CPC ........... H02K 3/34; H02K 3/345; H02K 1/26; H02K 1/32; H02K 1/265; H02K 1/02; H02K 1/00; H02K 1/28; H02K 1/325; H02K 1/24; H02K 1/276; H02K 1/2766; H02K 3/18; H02K 19/02; H02K 19/16; H02K 19/38; H02K 9/22; H02K 9/02; H02K 5/203; H02K 5/04; H02K 5/20; H02K 9/193; H02K 1/20

USPC ................ 310/52–59, 61, 216.074, 216.091, 310/261.1–266, 216.001, 216, 262, 433, 310/216.132, 216.086, 216.079, 216.013, 310/216.004, 269
See application file for complete search history.

(56) References Cited

U.S. PATENT DOCUMENTS

| | | | |
|---|---|---|---|
| 5,189,325 A * | 2/1993 | Jarczynski | H02K 9/197 310/61 |
| 8,080,908 B2 * | 12/2011 | Matsubara | H02K 1/32 310/156.53 |
| 8,970,074 B2 * | 3/2015 | Wagner | H02K 7/003 310/59 |
| 9,729,018 B2 | 8/2017 | Koenig et al. | |
| 10,128,701 B2 | 11/2018 | Dlala et al. | |
| 10,396,631 B2 | 8/2019 | Herb | |
| 11,626,765 B2 * | 4/2023 | Ronning | H02K 1/2733 310/59 |
| 11,942,825 B2 * | 3/2024 | Druant | H02K 11/33 |
| 2004/0080218 A1 * | 4/2004 | Weidman | H02K 1/32 310/61 |
| 2006/0082228 A1 * | 4/2006 | Urbahn | H02K 9/20 62/50.7 |
| 2013/0038151 A1 * | 2/2013 | Ohashi | H02K 7/086 310/59 |
| 2014/0333163 A1 * | 11/2014 | Horii | H02K 9/10 310/59 |
| 2017/0197502 A1 * | 7/2017 | Yukishima | H02K 7/006 |
| 2018/0241289 A1 * | 8/2018 | Desbiens | H02K 5/203 |
| 2020/0036249 A1 * | 1/2020 | Krais | H02K 9/197 |

* cited by examiner

MOTOR HAVING MULTIPLE COOLING FLOW CHANNELS, ARC-SHAPED CHANNEL, AND LIQUID THROWING HOLES

CROSS REFERENCE TO RELATED APPLICATION

This application claims priority to the Chinese Patent Application No. 202111578359.3 with a filing date of Dec. 22, 2021. The content of the aforementioned application, including any intervening amendments thereto, is incorporated herein by reference.

TECHNICAL FIELD

The present disclosure relates to the technical field of machine manufacturing, and in particular, to a motor having multiple cooling flow channels.

BACKGROUND

As one of the core components of an electric drive system of a new energy vehicle, a drive motor directly affects the performance of the drive system, thereby affecting main performance indicators of the new energy vehicle.

The temperature rise control of a motor is a key issue for the electric drive system. A permanent magnet synchronous motor of the new energy vehicle has the following technical problems:
 a housing of the motor has low heat dissipation efficiency; during operating, a winding of a stator generates heat seriously and the temperature rise is too high, which causes an increase in copper consumption and difficulty in heat dissipation, thereby affecting the operating efficiency of the motor; and a permanent magnet may produce irreversible demagnetization at a high temperature, which seriously affects the life and safety of the motor. In particular, the current motors develop towards high speed, high power density and high efficiency. This requires efficient cooling of the housing, stator and rotor of the permanent magnet synchronous motor.

Therefore, it is necessary to develop a motor having multiple cooling flow channels.

SUMMARY

In view of the technical problems in the prior art, an objective of the present disclosure is to provide a motor having multiple cooling flow channels, which can cool a housing, a stator, and a rotor of a motor, thereby effectively reducing the temperature of the motor, and enabling the motor to maintain an efficient operating state.

To realize the above objective, the present disclosure adopts the following technical solutions:

A motor having multiple cooling flow channels, including a housing, a stator, and a rotor, the stator being provided with a stator core and a winding, where the housing comprises a cooling liquid inlet, an arc-shaped flow channel, and a cooling liquid outlet; the arc-shaped flow channel is defined around the housing and connected to the stator core; the rotor comprises a rotor flow channel; both the rotor flow channel and the arc-shaped flow channel are communicated with the cooling liquid inlet and the cooling liquid outlet; and the rotor flow channel and the arc-shaped flow channel respectively correspond to two ends of the winding.

Furthermore, the housing further comprises a housing axial flow channel; the rotor flow channel includes a rotor cavity provided in the middle of the rotor; liquid throwing holes are defined on a side wall of the rotor; and the cooling liquid inlet, the housing axial flow channel, the rotor cavity, the liquid throwing holes, and the cooling liquid outlet are communicated in sequence.

Furthermore, the rotor includes a rotating shaft, a rotor punching sheet stack mounted on the rotating shaft, and a rotor pressure plate mounted at an end of the rotor punching sheet stack; the rotor cavity is arranged in the middle of the rotating shaft; the liquid throwing holes are defined on a side wall of the rotating shaft; the rotor pressure plate comprises a rotor pressure plate liquid inlet and a rotor pressure plate liquid outlet; the rotor punching sheet stack comprises a rotor punching sheet axial flow channel; the liquid throwing holes, the rotor pressure plate liquid inlet, the rotor punching sheet axial flow channel, the rotor pressure plate liquid outlet, and the cooling liquid outlet are communicated in sequence; the rotor pressure plate liquid inlet and the rotor pressure plate liquid outlet are arranged in a staggered manner; and the rotor pressure plate liquid outlet and the winding are arranged correspondingly.

Furthermore, the rotor pressure plate includes a first rotor pressure plate and a second rotor pressure plate respectively provided at two ends of the rotor punching sheet stack and arranged in a staggered manner; there are at least two groups of liquid throwing holes; each group of liquid throwing holes includes a plurality of liquid throwing holes evenly arranged around the rotating shaft; two adjacent groups of liquid throwing holes are arranged in a staggered manner; and each liquid throwing hole is arranged corresponding to the rotor pressure plate liquid inlet.

Furthermore, the arc-shaped flow channel includes a plurality of S-shaped flow channels connected in sequence.

Furthermore, liquid spraying holes are defined on an inner side of the housing, are communicated with the arc-shaped flow channel, and are arranged corresponding to the ends of the winding.

Furthermore, the housing comprises two spraying flow channels; the two spraying flow channels are respectively defined on two sides of the arc-shaped flow channel and are respectively communicated with two ends of the arc-shaped flow channel; the spraying flow channels are defined around the housing; and the liquid spraying holes are communicated with the spraying flow channels.

Furthermore, a liquid spraying ring is provided between the spraying flow channel and the winding; and the liquid spraying hole is defined on the liquid spraying ring.

Furthermore, there are a plurality of liquid spraying holes evenly arranged around the liquid spraying ring.

Furthermore, a heat exchanger is provided outside the housing, and two ends of the heat exchanger are respectively connected to the cooling liquid inlet and the cooling liquid outlet.

To sum up, the present disclosure has the following advantages:

A cooling liquid enters from the cooling liquid inlet of the housing, and flows into the housing axial flow channel. Some of the cooling liquid flows into the arc-shaped flow channel, which can efficiently cool the stator and the housing. Then, the cooling liquid enters the spraying flow channels, and are sprayed out from the liquid spraying holes to efficiently cool the winding. In the flow process of the cooling liquid, the housing, the stator, and the winding of the motor are cooled in sequence. The remaining cooling liquid continuous flowing from the housing axial flow channel to enter the rotor cavity in the middle of the rotor. Next, the cooling liquid flows through the rotor punching sheet axial flow channel to cool the rotor, is then thrown out from the pressure plate liquid outlet to cool the winding, and is finally discharged from the cooling liquid outlet of the housing. The housing, the stator, the rotor, and the winding of the motor are sequentially cooled in the entire flow process of the cooling liquid, thereby effectively reducing the temperature of the motor, and enabling the motor to maintain an efficient operating state.

REFERENCE NUMERALS

1. Housing; 11. Cooling liquid inlet; 12. S-shaped flow channel; 13. Spraying flow channel; 14. Housing axial flow channel; 15. Liquid collecting tank; 16. Cooling liquid outlet;
2. Liquid spraying ring; 21. Liquid spraying hole;
31. Rotary housing; 311. Rotary housing radial flow channel; 312. Rotary housing axial flow channel; 32. Front end cover; 321. Front end cover radial flow channel; 322. Bearing oil inlet hole; 33. Packaged framework oil seal;
4. Rear end cover; 41. Rear end cover radial flow channel; 42. Bearing oil inlet hole;
51. Rotating shaft; 511. Rotor cavity; 512. Rotating shaft liquid inlet; 513. Liquid throwing hole; 52. Rotor punching sheet stack; 521. Rotor punching sheet axial flow channel; 53. Rotor pressure plate; 531. Pressure plate liquid inlet; 532. Pressure plate liquid outlet;
61. Stator core; 62. Winding.

DETAILED DESCRIPTION OF THE EMBODIMENTS

The present disclosure will be further described in detail below.

Figure 1:
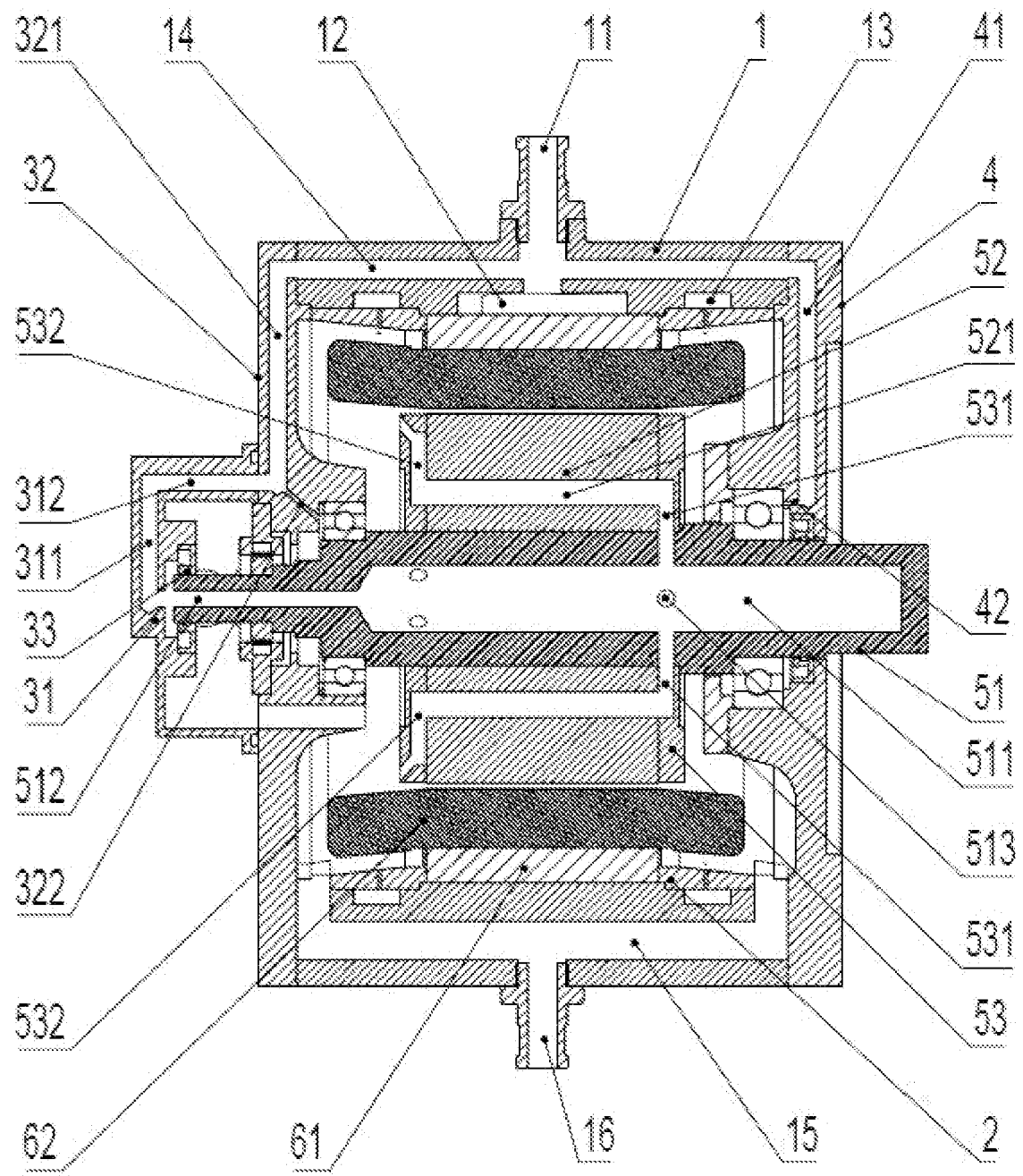
FIG. 1 is a schematic cross-sectional structural diagram of the present disclosure.

As shown in FIG. 1, a motor having multiple cooling flow channels includes a housing 1, a stator, and a rotor. The stator comprises a stator core 61 and a winding 62. The housing 1 comprises a cooling liquid inlet 11, an arc-shaped flow channel, and a cooling liquid outlet 16. The arc-shaped flow channel is defined around the housing 1 and connected to the stator core 61. The rotor comprises a rotor flow channel. Both the rotor flow channel and the arc-shaped flow channel are communicated with the cooling liquid inlet 11 and the cooling liquid outlet 16. The rotor flow channel and the arc-shaped flow channel respectively correspond to two ends of the winding 62.

Specifically, after a cooling liquid enters from the cooling liquid inlet 11 of the housing 1, some of the cooling liquid enters the arc-shaped flow channel defined around the housing 1 for cooling the housing 1 and the stator core 61 of the motor. The arc-shaped flow channel and the housing 1 have a larger contact area, thereby achieving a better cooling effect. The remaining cooling liquid enters the rotor flow channel for cooling the rotor. Since the rotor flow channel and the arc-shaped flow channel respectively correspond to the ends of the winding 62, the cooling liquid flows through the rotor flow channel and the arc-shaped flow channel for respectively cooling the ends of the winding 62, and finally, the cooling liquid flows out from the cooling liquid outlet 16 to complete one cooling process. The housing 1, the stator, and the rotor of the motor are separately cooled through the arc-shaped flow channel and the rotor flow channel in the entire flow process of the cooling liquid, thereby effectively reducing the temperature of the motor; and the structure having multiple cooling flow channels enables the motor to maintain an efficient operating state.

The housing 1 further comprises a housing axial flow channel 14. The rotor flow channel includes a rotor cavity 511 provided in the middle of the rotor. Liquid throwing holes 513 are defined on a side wall of the rotor. The cooling liquid inlet 11, the housing axial flow channel 14, the rotor cavity 511, the liquid throwing holes 513, and the cooling liquid outlet 16 are communicated in sequence.

The cooling liquid flows through the housing axial flow channel 14 for cooling the housing 1 of the motor. The cooling liquid continues flowing in the housing axial flow channel 14, and enters the rotor cavity 511 in the middle of the rotor to cool the rotor. Next, the cooling liquid flows out of the liquid throwing holes 513 on the side wall of the rotor, and is finally discharged from the cooling liquid outlet 16 of the housing 1. The housing axial flow channel 14 not only improves the cooling effect of the housing 1, but also builds a flow path between the cooling liquid inlet 11 and the rotor cavity 511, such that the cooling liquid can flow from the cooling liquid inlet 11 to the rotor cavity 511.

As shown in FIG. 4 to FIG. 7, the rotor includes a rotating shaft 51 and a rotor punching sheet stack 52 mounted on the rotating shaft 51. Rotor pressure plates 53 are respectively mounted at two ends of the rotor punching sheet stack 52, which are respectively a first rotor pressure plate and a second rotor pressure plate. The rotor cavity 511 is arranged in the middle of the rotating shaft 51. The liquid throwing holes 513 are defined on a side wall of the rotating shaft 51. The two rotor pressure plates 53 are the same component, and form an included angle of 45 degrees during mounting. Each of the two rotor pressure plates 53 comprises a rotor pressure plate liquid inlet 531 and a rotor pressure plate liquid outlet 532. The rotor pressure plate liquid inlet 531 and the rotor pressure plate liquid outlet 532 on a same rotor pressure plate 53 are arranged in a Union Jack shape, and form an included angle of 45 degrees. The rotor punching sheet stack 52 comprises a rotor punching sheet axial flow channel 521. The liquid throwing holes 513, the rotor pressure plate liquid inlet 531, the rotor punching sheet axial flow channel 521, the rotor pressure plate liquid outlet 532, and the cooling liquid outlet 16 are communicated in sequence. The cooling liquid further reduces the working temperature of the rotor when flowing through the rotor punching sheet stack 52 and the rotor pressure plate 53.

In this embodiment, there are two groups of liquid throwing holes 513. Each group of liquid throwing holes 513 includes four liquid throwing holes 513 evenly arranged around the rotating shaft 51. The two groups of liquid throwing holes 513 are staggered by an angle of 45 degrees, are arranged in a Union Jack shape, and respectively correspond to the pressure plate liquid inlets 531 of the rotor pressure plates 53 at both ends.

The rotor pressure plate liquid outlet 532 is arranged corresponding to an end of the winding 62. The winding 62 is arranged on the stator. Under the action of rotation and centrifugation of the rotor, the cooling liquid is thrown out from the rotor pressure plate liquid outlet 532, and is poured onto the end of the winding 62 to cool the end of the winding 62, which fully exerts the cooling effect of the cooling liquid in the entire flow process.

Preferably, the cooling liquid inlet 11 is arranged at the upper end of the housing 1, and the cooling liquid outlet 16 is arranged at the lower end of the housing 1, such that the cooling liquid can flow from top to bottom by gravity. A liquid collecting tank 15 is defined on the housing 1 between the rotor pressure plate liquid outlet 532 and the cooling liquid outlet 16, and is separately communicated with the rotor pressure plate liquid outlet 532 and the cooling liquid outlet 16. The cooling liquid thrown out from the rotor pressure plate liquid outlet 532 flows downward after cooling the end of the winding 62, then converges in the liquid collecting tank 15, and finally flows out from the cooling liquid outlet 16 of the housing 1.

Figure 6:
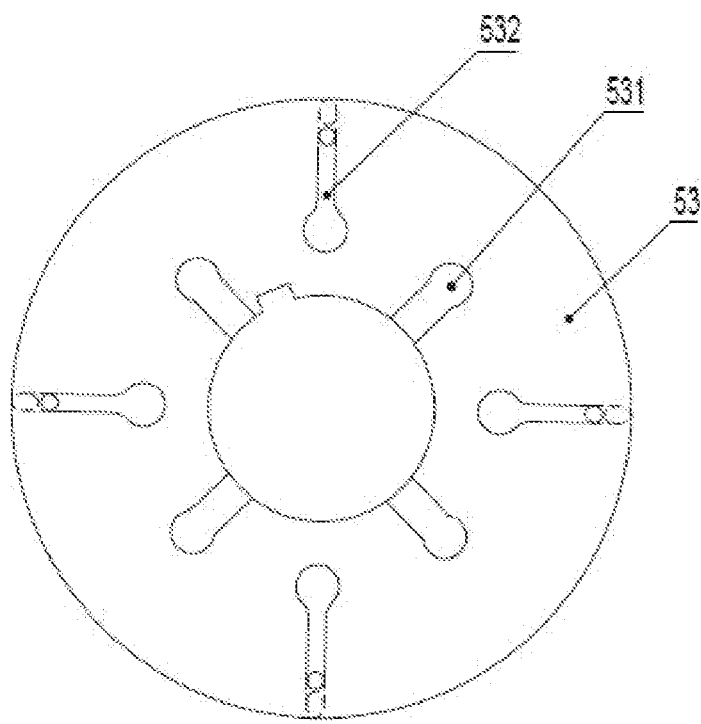
FIG. 6 is a schematic structural diagram of a rotor pressure plate according to the present disclosure.
Figure 7:
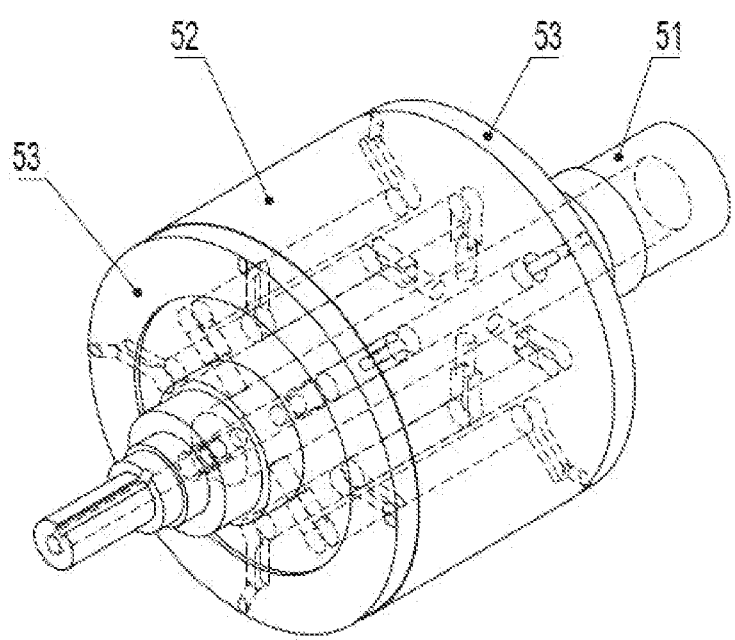
FIG. 7 is a schematic structural diagram of a rotor flow channel according to the present disclosure.

Preferably, as shown in FIG. 6 and FIG. 7, the liquid throwing holes 513 on the left side, the pressure plate liquid inlet 531 of a first rotor pressure plate (the rotor pressure plate 53 on the left side), the rotor punching sheet axial flow channel 521, and the pressure plate liquid outlet 532 of a second rotor pressure plate (the rotor pressure plate 53 on the right side) are communicated in sequence to form a rotor flow channel from left to right; and the liquid throwing holes 513 on the right side, the pressure plate liquid inlet 531 of the second rotor pressure plate (the rotor pressure plate 53 on the right side), the rotor punching sheet axial flow channel 521, and the pressure plate liquid outlet 532 of the second rotor pressure plate (the rotor pressure plate 53 on the left side) are communicated in sequence to form a rotor flow channel from right to left. The two rotor flow channels in opposite directions simultaneously guide the flow direction of the cooling liquid, such that the overall cooling effect of the rotor is more balanced, the speed of the cooling liquid thrown out from both ends of the rotor punching sheet axial flow channel 521 is more uniform, the uniformity of temperature rise of the winding 62 can be controlled more effectively, and the cooling efficiency is effectively improved.

As shown in FIG. 1, a front end cover 32 and a rear end cover 4 are respectively provided on both sides of the rotating shaft 51, where the front end cover 32 comprises a front end cover radial flow channel 321, and the rear end cover 4 comprises a rear end cover radial flow channel 41. Preferably, the front end cover 32 is fixedly connected to a rotary housing 31, which is arranged corresponding to the rotating shaft 51. The rotary housing 31 comprises a rotary housing axial flow channel 312 and a rotary housing radial flow channel 311 connected to each other. The front end cover radial flow channel 321, the rear end cover radial flow channel 41, the rotary housing axial flow channel 312, the rotary housing radial flow channel 311, and the rotor cavity 511 are communicated one another.

A bearing oil inlet hole a322 and a bearing oil inlet hole b42 are respectively connected to the front end cover radial flow channel 321 and the rear end cover radial flow channel 41. A small part of the cooling liquid flowing through the front end cover radial flow channel 321 and the rear end cover radial flow channel 41 flows into the bearing oil inlet a322 and the bearing oil inlet b42, and is sprayed on the bearing to cool the bearing, thereby prolonging the service life of the bearing.

The rotating shaft 51 comprises a rotating shaft liquid inlet 512, the rotating shaft liquid inlet 512 is separately communicated with the rotary housing radial flow channel 311 and the rotor cavity 511, and the rotating shaft liquid inlet 512 is sleeved with a packaged framework oil seal 33 to prevent the cooling liquid from leaking.

Figure 2:
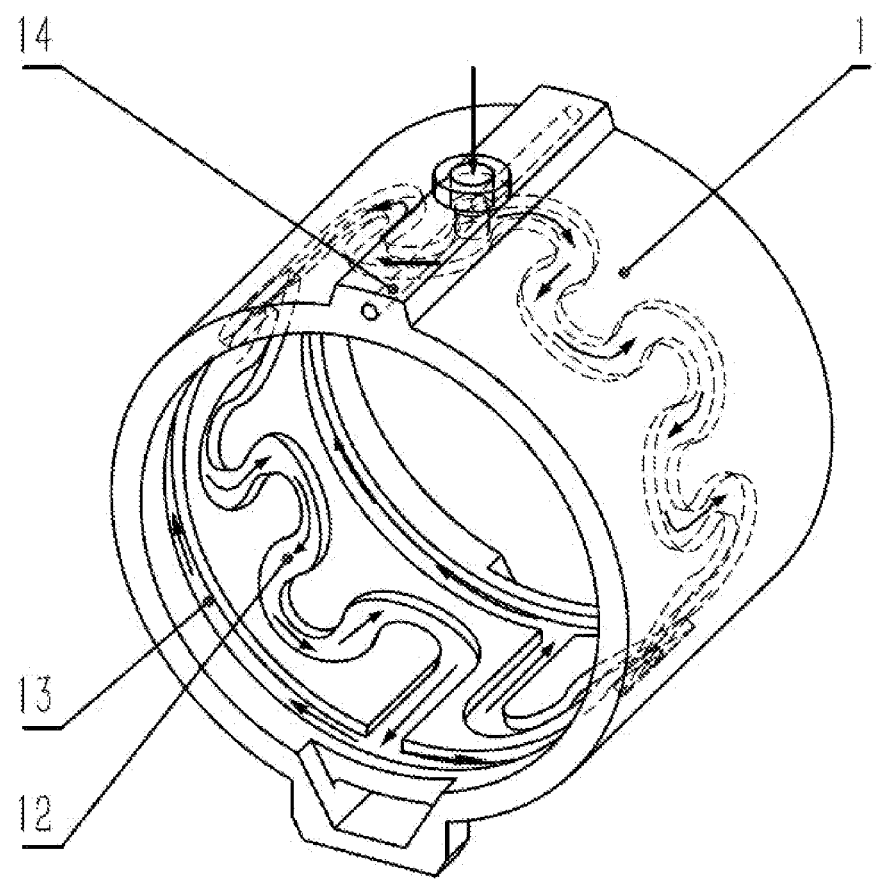
FIG. 2 is a schematic structural diagram of an S-shaped flow channel and a spraying flow channel of a housing according to the present disclosure.

As shown in FIG. 2, the arc-shaped flow channel includes a plurality of S-shaped flow channels 12 connected in sequence. The S-shaped flow channels 12 increase the contact area between the arc-shaped flow channel and the housing 1, and the turning places thereof are all arc-shaped, thereby reducing the passing resistance of the cooling liquid, and improving the cooling effect.

Liquid spraying holes 21 are defined on an inner side of the housing 1, are communicated with the arc-shaped flow channel, and are arranged corresponding to the ends of the winding 62. The liquid spraying holes 21 are provided, such that the cooling liquid can cool the ends of the winding 62 when flowing through the arc-shaped flow channel.

The housing 1 comprises two spraying flow channels 13; the two spraying flow channels 13 are respectively defined on two sides of the arc-shaped flow channel and are respectively communicated with two ends of the arc-shaped flow channel; the spraying flow channels 13 are defined around the housing 1; and the liquid spraying holes 21 are communicated with the spraying flow channels 13. The spraying flow channels 13 not only increase the contact area between the cooling liquid and the housing 1 to improve the cooling effect of the housing 1, but also provide the liquid spraying holes 21 for the cooling liquid in the arc-shaped flow channel to cool the ends of the winding 62. The spraying flow channels 13 are annular, the arc-shaped flow channel is continuous curve-shaped, and the cooling liquid flows between the annular spraying flow channel 13 and the continuous curve-shaped arc-shaped flow channel, thereby improving the cooling effect.

Figure 3:
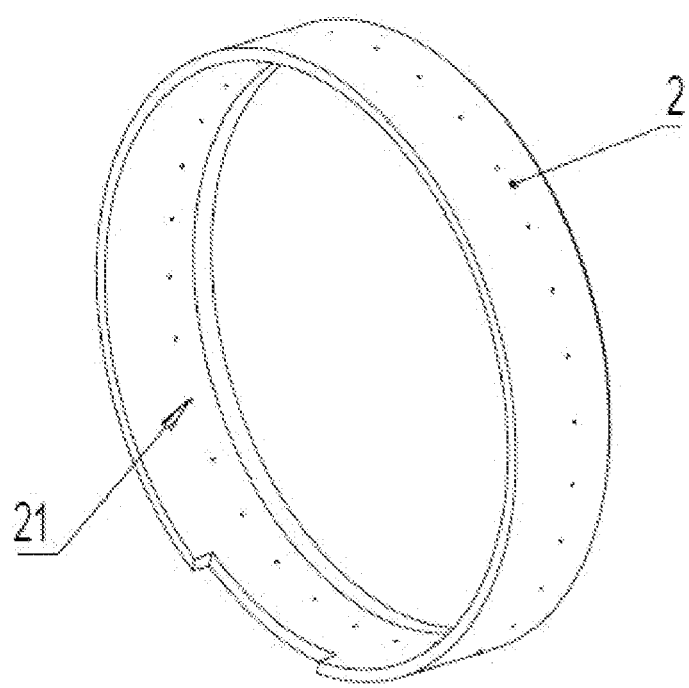
FIG. 3 is a schematic structural diagram of an oil spraying ring according to the present disclosure.
Figure 4:
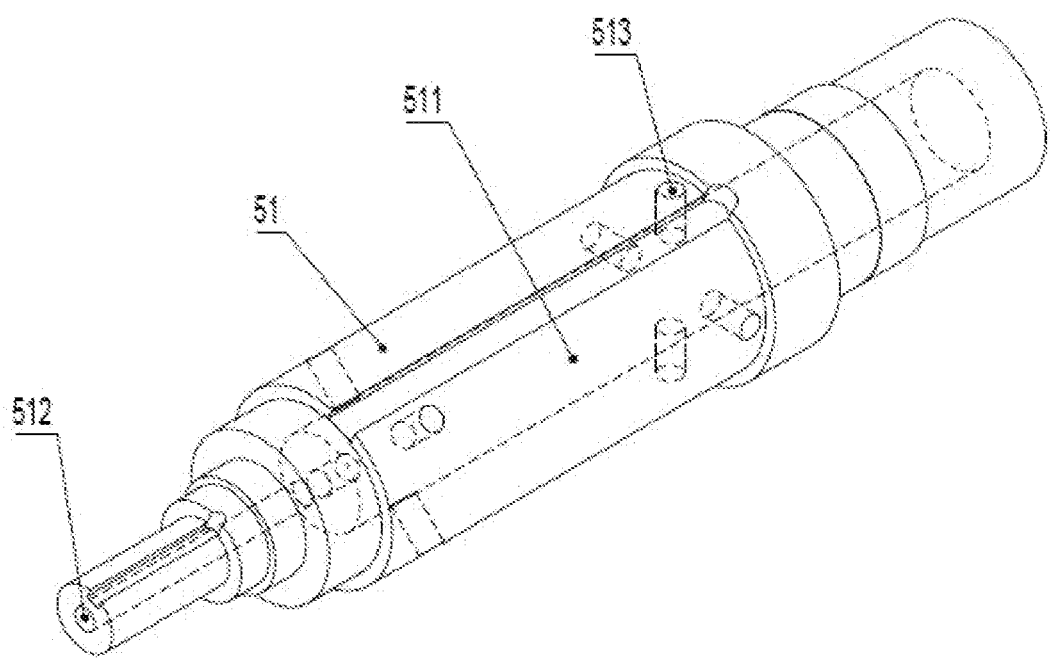
FIG. 4 is a schematic structural diagram of a rotating shaft according to the present disclosure.
Figure 5:
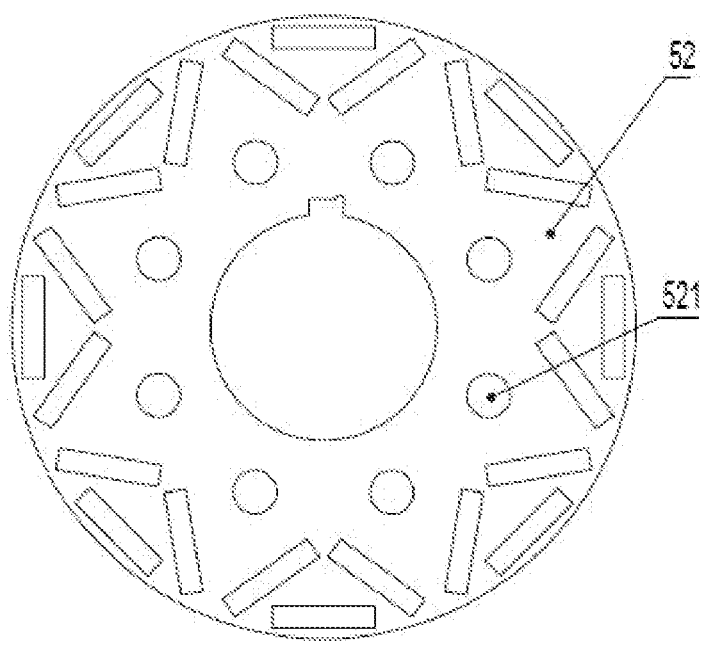
FIG. 5 is a schematic structural diagram of a rotor punching sheet according to the present disclosure.

As shown in FIG. 3, specifically, a liquid spraying ring 2 is provided between the spraying flow channel 13 and the winding 62, the liquid spraying ring 2 is arranged around an end of the winding 62; and the liquid spraying hole 2 is defined on the liquid spraying ring 2. There are a plurality of liquid spraying holes 21 evenly arranged around the liquid spraying ring 2, which can spray and cool the ends of the entire winding 62. The liquid spraying hole 21 has a small caliber, such that the cooling liquid sprayed from the liquid spraying hole 21 is at a certain rate, thereby achieving a good cooling effect.

Figure 8:
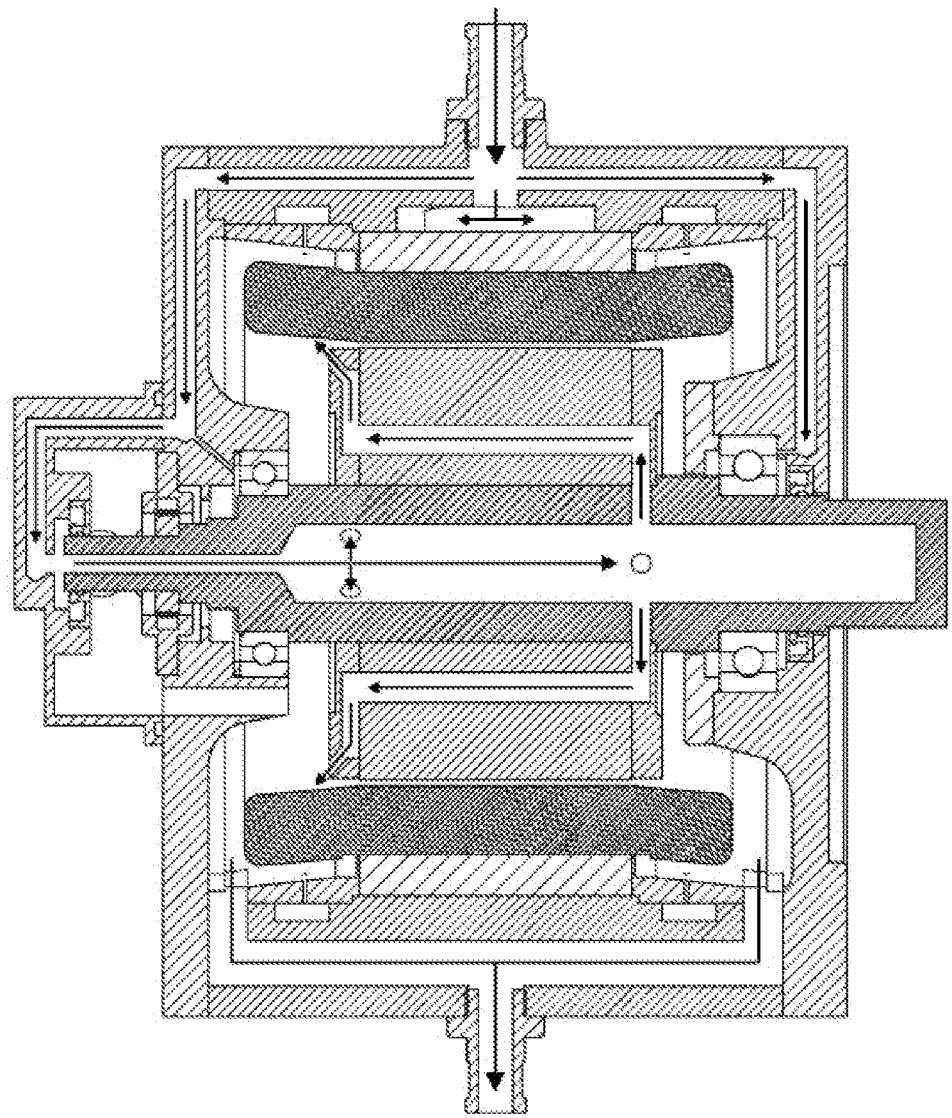
FIG. 8 is a diagram of an oil way of a motor according to the present disclosure.

The operating process:

As shown in FIG. 8, the cooling liquid enters from the cooling liquid inlet 11 of the housing 1. Some of the cooling liquid downwards enters the S-shaped flow channel 12, and flows toward two opposite directions of the S-shaped flow channel 12 to cool the housing 1 and the stator core 61. The S-shaped flow channel 12 is connected to the spraying flow channels 13 in two axial directions of the housing 1 toward the front end cover 32 and toward the rear end cover 4. The cooling liquid flows into the spraying flow channels 13 at the bottommost end of the S-shaped flow channel 12. The cooling liquid flows along the spraying flow channels 13, is sprayed out from the liquid spraying holes 21 formed in the liquid spraying rings 2, and is sprayed to the ends of the winding 62 to cool the ends of the winding 62. Finally, the sprayed cooling liquid flows downwards and gathers in the liquid collecting tank 15 of the housing 1 under the action of gravity. The remaining cooling liquid flows to the housing axial flow channel 14, then flows through the front end cover radial flow channel 321, the rotary housing axial flow channel 312, and the rotary housing radial flow channel 311, then flows into the rotor cavity 511 from the rotating shaft liquid inlet 512, then is thrown out from two groups of liquid throwing holes 513 to flow into the pressure plate liquid inlet 531, then flows into the rotor punching sheet axial flow channel 521 to cool the inside of the rotor punching sheet stack 52, and then is thrown out from the pressure plate liquid outlet 532 to fall onto the ends of the winding 62 of a stator assembly to cool the ends of the winding 62; and finally, the cooling liquid flows downward into the liquid collecting tank 15 of the housing 1 under the action of gravity, and flows out from the cooling liquid outlet 16. A heat exchanger is provided outside the housing 1, and two ends of the heat exchanger are respectively connected to the cooling liquid inlet 11 and the cooling liquid outlet 16. After being discharged from the cooling liquid outlet 16, the cooling liquid flows into the heat exchanger through an external oil passage for heat exchange, and then is pumped into the cooling liquid inlet 11 through an oil pump, thereby performing a new round of cooling cycle for the motor.

Compared with the prior art, the present disclosure has the following advantages:

Through the design of multiple cooling flow channels, the housing 1, the stator, the winding 62, and the rotor of the motor can be cooled comprehensively. The S-shaped flow channel 12 can effectively reduce the temperature rise of the housing 1 and the stator of the motor. The spraying flow channels 13 can effectively reduce the temperature rise of the ends of the winding 62. The rotor flow channel can effectively reduce the temperature of the rotor, and can cool the ends of the winding 62 at the same time. The multiple cooling flow channels effectively reduce the overall temperature rise of the motor, thereby improving the operating efficiency of the motor, and prolonging the service life of the motor.

The above embodiment is a preferred implementation of the present disclosure. However, the implementations of the present disclosure are not limited by the above embodiment. Any change, modification, combination, simplification, improvement and the like made without departing from the spiritual essence and principle of the present disclosure should be an equivalent replacement manner, and all are included in a protection scope of the present disclosure.

What is claimed is:

1. A motor having multiple cooling flow channels, comprising a housing, a stator, and a rotor, wherein the stator comprises a stator core and a winding; the housing comprises a cooling liquid inlet, an arc-shaped flow channel, and a cooling liquid outlet; the arc-shaped flow channel is defined around the housing and connected to the stator core; the rotor comprises a rotor flow channel; both the rotor flow channel and the arc-shaped flow channel are communicated with the cooling liquid inlet and the cooling liquid outlet; and the rotor flow channel and the arc-shaped flow channel respectively correspond to two ends of the winding;

wherein the arc-shaped flow channel comprises a plurality of S-shaped flow channels connected in sequence;

wherein liquid spraying holes are defined on an inner side of the housing, are communicated with the arc-shaped flow channel, and are arranged corresponding to the two ends of the winding.

2. The motor according to claim 1, wherein a heat exchanger is provided outside the housing, and two ends of the heat exchanger are respectively connected to the cooling liquid inlet and the cooling liquid outlet.

3. The motor according to claim 1, wherein the housing further comprises a housing axial flow channel; the rotor flow channel comprises a rotor cavity provided in a middle of the rotor; liquid throwing holes are defined on a side wall of the rotor; and the cooling liquid inlet, the housing axial flow channel, the rotor cavity, the liquid throwing holes, and the cooling liquid outlet are communicated in sequence.

4. The motor according to claim 3, wherein the rotor comprises a rotating shaft, a rotor punching sheet stack mounted on the rotating shaft, and a rotor pressure plate mounted at an end of the rotor punching sheet stack; the rotor cavity is arranged in a middle of the rotating shaft; the liquid throwing holes are defined on a side wall of the rotating shaft; the rotor pressure plate comprises a rotor pressure plate liquid inlet and a rotor pressure plate liquid outlet; the rotor punching sheet stack comprises a rotor punching sheet axial flow channel; the liquid throwing holes, the rotor pressure plate liquid inlet, the rotor punching sheet axial flow channel, the rotor pressure plate liquid outlet, and the cooling liquid outlet are communicated in sequence; the rotor pressure plate liquid inlet and the rotor pressure plate liquid outlet are arranged in a staggered manner; and the rotor pressure plate liquid outlet and the winding are arranged correspondingly.

5. The motor according to claim 4, wherein the rotor pressure plate comprises a first rotor pressure plate and a second rotor pressure plate respectively provided at two ends of the rotor punching sheet stack and arranged in a staggered manner; there are at least two groups of liquid throwing holes; each group of liquid throwing holes comprises a plurality of liquid throwing holes evenly arranged around the rotating shaft; two adjacent groups of liquid throwing holes are arranged in a staggered manner; and each liquid throwing hole is arranged corresponding to the rotor pressure plate liquid inlet.

6. The motor according to claim 1, wherein the housing further comprises two spraying flow channels; the two spraying flow channels are respectively defined on two sides of the arc-shaped flow channel and are respectively communicated with two ends of the arc-shaped flow channel; the spraying flow channels are defined around the housing; and the liquid spraying holes are communicated with the spraying flow channels.

7. The motor according to claim 6, wherein a liquid spraying ring is provided between the spraying flow channel and the winding; and the liquid spraying hole is defined on the liquid spraying ring.

8. The motor according to claim 7, wherein there are a plurality of liquid spraying holes evenly arranged around the liquid spraying ring.

9. A motor having multiple cooling flow channels, comprising a housing, a stator, and a rotor, wherein the stator comprises a stator core and a winding; the housing comprises a cooling liquid inlet, an arc-shaped flow channel, and a cooling liquid outlet; the arc-shaped flow channel is defined around the housing and connected to the stator core; the rotor comprises a rotor flow channel; both the rotor flow channel and the arc-shaped flow channel are communicated with the cooling liquid inlet and the cooling liquid outlet;

and the rotor flow channel and the arc-shaped flow channel respectively correspond to two ends of the winding;

wherein the housing further comprises a housing axial flow channel; the rotor flow channel comprises a rotor cavity provided in a middle of the rotor; liquid throwing holes are defined on a side wall of the rotor; and the cooling liquid inlet, the housing axial flow channel, the rotor cavity, the liquid throwing holes, and the cooling liquid outlet are communicated in sequence;

wherein the rotor comprises a rotating shaft, a rotor punching sheet stack mounted on the rotating shaft, and a rotor pressure plate mounted at an end of the rotor punching sheet stack; the rotor cavity is arranged in a middle of the rotating shaft; the liquid throwing holes are defined on a side wall of the rotating shaft; the rotor pressure plate comprises a rotor pressure plate liquid inlet and a rotor pressure plate liquid outlet; the rotor punching sheet stack comprises a rotor punching sheet axial flow channel; the liquid throwing holes, the rotor pressure plate liquid inlet, the rotor punching sheet axial flow channel, the rotor pressure plate liquid outlet, and the cooling liquid outlet are communicated in sequence; the rotor pressure plate liquid inlet and the rotor pressure plate liquid outlet are arranged in a staggered manner; and the rotor pressure plate liquid outlet and the winding are arranged correspondingly.

* * * * *